US012056003B1

(12) United States Patent
Ramos et al.

(10) Patent No.: US 12,056,003 B1
(45) Date of Patent: Aug. 6, 2024

(54) METHODS AND SYSTEMS OF INCIDENT MANAGEMENT EMPLOYING PREEMPTIVE INCIDENT PREVENTION AND SELF HEALING PROCESSING

(71) Applicant: MORGAN STANLEY SERVICES GROUP INC., New York, NY (US)

(72) Inventors: Alberto Ramos, Milltown, NJ (US); Vilas Hareshwar Mhatre, Lexington, MA (US); Kumar Vadaparty, Belle Mead, NJ (US); Darryl Alan Sansbury, Weddington, NC (US); Velliangiri Karuppusamy, Robbinsville, NJ (US); Bijaya Kumar Pradhan, Edison, NJ (US); David Testa, Robbinsville, NJ (US); Freddy Reyes, Corona, NY (US); Abhishek Soni, Jersey City, NJ (US); Piyush Aggarwal, Alpharetta, GA (US); Marcelo Leifert, Great Neck, NY (US); Judith Christi Joy, Princeton, NJ (US)

(73) Assignee: MORGAN STANLEY SERVICES GROUP INC., New York, NY (US)

( * ) Notice: Subject to any disclaimer, the term of this patent is extended or adjusted under 35 U.S.C. 154(b) by 0 days.

(21) Appl. No.: 18/440,976

(22) Filed: Feb. 14, 2024

(51) Int. Cl.
*G06F 11/00* (2006.01)
*G06F 11/07* (2006.01)

(52) U.S. Cl.
CPC .......... *G06F 11/079* (2013.01); *G06F 11/004* (2013.01); *G06F 11/0709* (2013.01); *G06F 11/0793* (2013.01); *G06F 2201/805* (2013.01)

(58) Field of Classification Search
CPC ............... G06F 11/079; G06F 11/0793; G06F 11/3466; G06F 11/3476; G06F 11/3072
See application file for complete search history.

(56) References Cited

U.S. PATENT DOCUMENTS

| | | |
|---|---|---|
| 10,601,740 B1 | 3/2020 | Harding et al. |
| 10,986,012 B1 | 4/2021 | Côté et al. |
| 11,481,310 B1 | 10/2022 | Panchev et al. |
| 11,736,418 B2 | 8/2023 | Pelov |
| 2016/0373588 A1* | 12/2016 | Raleigh ............... H04L 12/1407 |
| 2018/0322462 A1 | 11/2018 | Jayaraman et al. |
| 2019/0050239 A1* | 2/2019 | Caldwell ............ G06F 11/0793 |
| 2020/0125901 A1 | 4/2020 | Pelov |
| 2020/0204452 A1 | 6/2020 | Bhat et al. |
| 2020/0409831 A1* | 12/2020 | Balasubramanian ....................... G06F 11/3688 |
| 2021/0200950 A1 | 7/2021 | Basu et al. |
| 2021/0304027 A1 | 9/2021 | Damodaran et al. |
| 2021/0385124 A1 | 12/2021 | Roy et al. |
| 2022/0292075 A1 | 9/2022 | Kudinova et al. |
| 2022/0407960 A1 | 12/2022 | Willshire |
| 2022/0407961 A1 | 12/2022 | Willshire et al. |

(Continued)

*Primary Examiner* — Charles Ehne
(74) *Attorney, Agent, or Firm* — Weitzman Law Offices, LLC

(57) ABSTRACT

A method and system of managing incidents in a system by employing preemptive incident prevention and self-healing processing. The method detects potential incidents and actual incidents in the system and performs self-healing prevention actions for any detected potential incidents and performs self-healing actions for any detected or notified incidents. The system performs an automated root cause analysis for event notifications related to an incident.

20 Claims, 6 Drawing Sheets

(56) References Cited

U.S. PATENT DOCUMENTS

2023/0107316 A1  4/2023  Ripa et al.
2023/0147668 A1* 5/2023  Penugonda ......... G06F 11/0772
                                            714/38.1

* cited by examiner

METHODS AND SYSTEMS OF INCIDENT MANAGEMENT EMPLOYING PREEMPTIVE INCIDENT PREVENTION AND SELF HEALING PROCESSING

FIELD OF INVENTION

This application relates to improving incident recovery time, and, more particularly, to systems and methods for performing preemptive incident and self-healing processing to reduce incident recovery time.

BACKGROUND

Many modern enterprises provide real-time services to users for twenty-four hours, seven days a week. Critical to the success in providing these services is the ability to quickly recover from incidents such as system outages or service disruptions. The mean time to recover (MTTR) has a very high standard deviation, particularly since some problems get solved quickly and others do not. Identification of the root cause for the incident is typically the major bottleneck when trying to resolve the incident. Thus, there is a need to quickly determine the root cause of an incident to thereby improve the enterprise platform's mean time to recover.

SUMMARY OF THE INVENTION

A system for managing incidents in a computer system is disclosed, including a chatbot to provide preemptive incident prevention and self-healing processing. The system comprises one or more input elements; one or more storage devices, including at least one database; one or more processors; one or more network interfaces for communication with the one or more input elements; a chatbot comprising a non-transitory memory comprising instructions. The instructions cause the processor to activate one or more preemptive incident processes to detect one or more potential incidents in the computer system; automatically perform one or more corresponding self-healing prevention actions in response to detecting the one or more potential incidents; activate one or more incident detection processes to detect an incident in the computer system; monitor a chat agent interface to determine whether an event notification has been received; perform an automated root cause analysis, in response to receiving an event notification related to an incident, to determine a likely cause of the incident; determine whether one or more self-healing actions can be orchestrated in the chatbot to manage the incident detected by the one or more incident detection processes and/or the event notification related to an incident; automatically perform the one or more self-healing actions when it is determined that the one or more self-healing actions can be orchestrated to manage the incident detected by the one or more incident detection processes and/or the event notification related to an incident; and determine one or more recommended recovery actions to manage the incident when it is determined that the one or more self-healing actions cannot be orchestrated in the chatbot to manage the incident detected by the one or more incident detection processes and/or the incident in relation to the event notification.

Likewise, A computer implemented method for managing incidents in a computer system including a chatbot to provide preemptive incident prevention and self-healing processing is also disclosed. The method comprises activating one or more preemptive incident processes to detect one or more potential incidents in the computer system; automatically performing one or more corresponding self-healing prevention actions in response to detecting the one or more potential incidents; activating one or more incident detection processes to detect an incident in the computer system; monitoring a chat agent interface to determine whether an event notification has been received; performing an automated root cause analysis, in response to receiving an event notification related to an incident, to determine a likely cause of the incident; determining whether one or more self-healing actions can be orchestrated in the chatbot to manage the incident detected by the one or more incident detection processes and/or the event notification related to an incident; automatically performing the one or more self-healing actions when it is determined that the one or more self-healing actions can be orchestrated to manage the incident detected by the one or more incident detection processes and/or the event notification related to an incident; and determining one or more recommended recovery actions to manage the incident when it is determined that the one or more self-healing actions cannot be orchestrated in the chatbot to manage the incident detected by the one or more incident detection processes and/or the incident in relation to the event notification.

The recovery actions may include, but are not limited to, message replay from an error messaging queue to a primary messaging queue; record entry to a database; calling additional webservices; and/or sending a message or event to another system. Before executing an action function, an action module checks against guardrail/safety rules relevant for that action to ensure that an AI agent processing the outcome is bounded and controlled. For example, when executing an action that is intended to act on testing data or dummy attributes to verify that software is ready for business (RFB) end to end check of production systems, the guardrail rule ensures that the attribute is indeed from a set of testing data, and not from potentially real data. The action will be prevented if a command does not relate to testing data, and user will be notified.

BRIEF DESCRIPTION OF THE DRAWINGS

Other aspects, features and advantages will become more fully apparent from the following detailed description, the appended claims, and the accompanying drawings, provided solely for purposes of illustration without restricting the scope of any embodiment:

DETAILED DESCRIPTION

Figure 1:
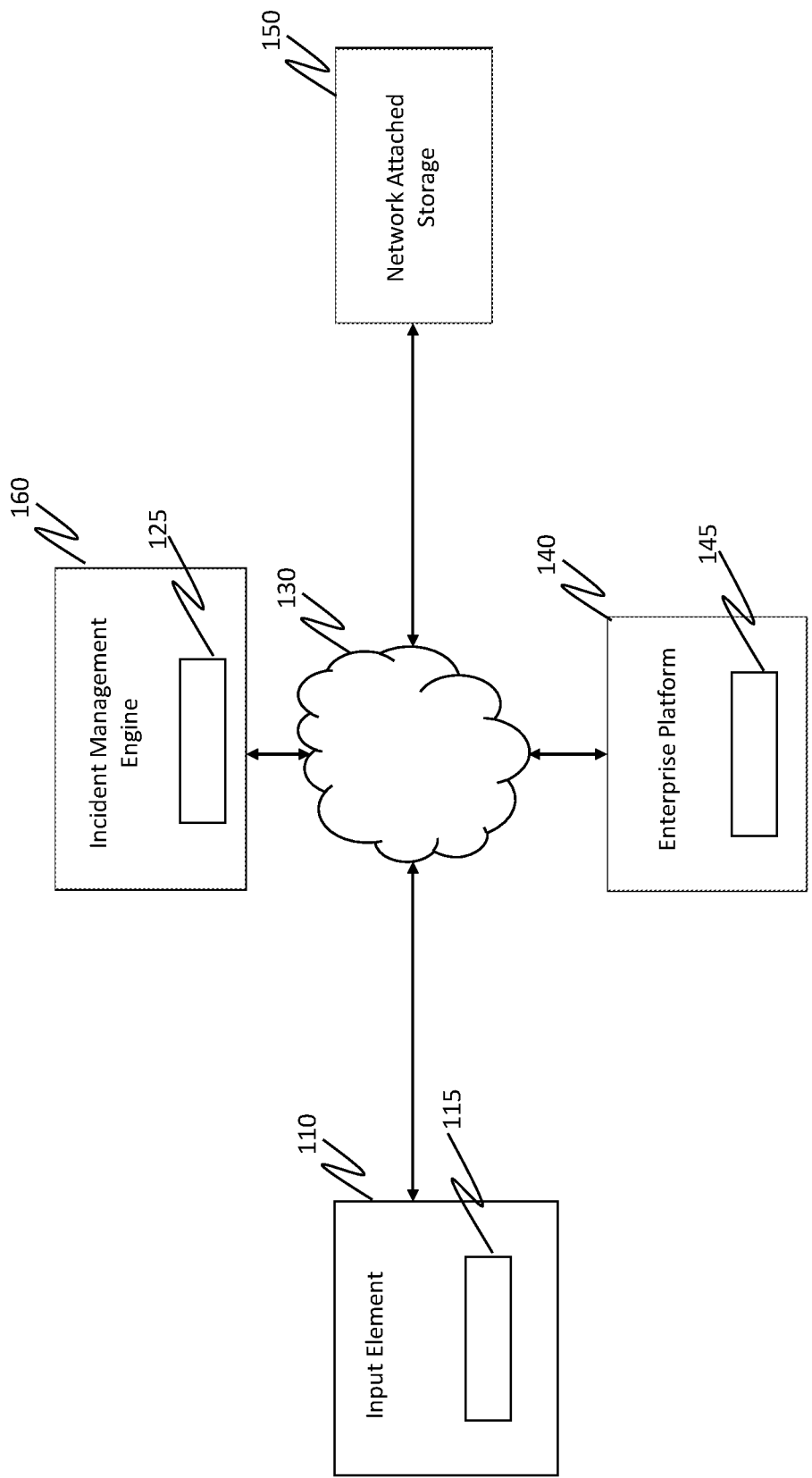
FIG. 1 depicts an illustrative architecture in which techniques and structures for providing the systems and methods disclosed herein may be implemented.

Example implementations of the teachings from the present disclosure provide systems and methods which address one or more of issues described above. FIG. 1 illustrates an example system environment 100 which is operable to facilitate preemptive incident and self-healing processing to reduce incident recovery time. The system environment ("the system") 100 can include one or more input elements 110, enterprise platform 140, enterprise store 150, incident management engine 160, and incident management store 170. All of the components in the system 100 may be connected by one or more networks 130 (e.g., LAN or WAN). Although the example shows a specific number of components, any number of components may be included in the system. Moreover, the system is not limited to the above disclosed components and may include additional components not germane to the claimed subject matter. In some implementations of the teachings herein, the one or more input elements and the enterprise platform may be combined.

An input element 110 may include one or more computing devices, systems, or services. Each input element includes incident management application 115, which interfaces with incident management engine 160, and which allows each input element to send and receive information to and from the incident management engine 160. Each input element may provide information (e.g., queries, triggers, alerts) to the incident management engine 160 to trigger one or more processes therein. The information sent to the incident management engine 160 may represent an event notification related to an incident or a non-incident. In some implementations of the teachings herein, a user, such as, for example, an IT operator, may use the input element to provide information to the incident management engine.

Enterprise platform 140 includes hardware and software system components to support one or more services provided over a network by the enterprise. These components may include one or more computing devices, computing systems, processors, databases (e.g., operational/Realtime DB, reference DB, etc.), a monitoring system (e.g., Prometheus), data stores (e.g., network attached storage (NAS), batch central repository, etc.), dashboards (e.g., Prometheus dashboard, etc.), and applications (e.g., Real Time Log, FIX, incident management application 145, etc.). When an incident (e.g., service outage or disruption) occurs in the enterprise platform, the incident management engine 140 may be triggered (e.g., by receiving an event notification) to analyze, respond to, mitigate, or resolve the incident. The enterprise platform includes an application (i.e., incident management app 145) to interface with the incident management engine 160.

In some implementations of the teachings herein, the enterprise platform 140 may operate as an input element to incident management engine 160. In this instance, one or more system components of the enterprise platform 140, such as, for example, a monitoring system component, may send notifications and/or alerts to the incident management engine, to trigger one or more processes therein. Each notification and/or alert represents an event notification related to an incident or a non-incident.

Further, in some implementations of the teachings herein, one or more of the system components of the enterprise platform 140 may receive data retrieval requests from the incident management engine, and may retrieve corresponding data from one or more system components and provide the data to the incident management engine.

Figure 2:
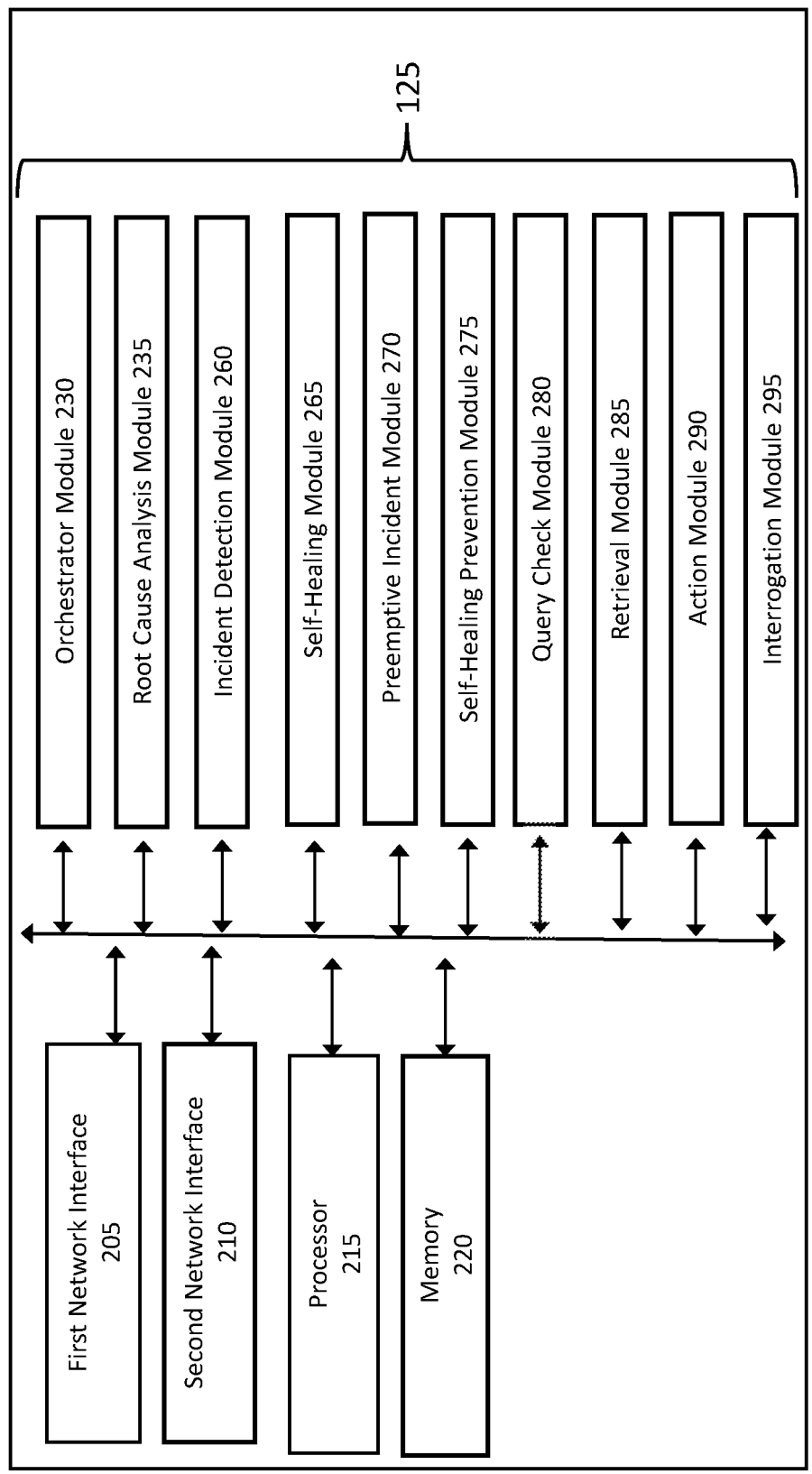
FIG. 2 depicts a high-level block diagram of a representative of an incident management engine according to an embodiment of the present disclosure.

Incident management engine 160 may detect, respond to, mitigate and/or resolve incidents occurring in enterprise platform 140. Turning to FIG. 2, the incident management engine 160 may be configured as a chatbot including a first network interface 205 (e.g., a chat agent user interface), a second network interface 210 (e.g., a chat agent system interface), using generative AI to create the text to be sent through the interfaces. The system also includes a processor 215, a memory 220, and an incident management application 125 including an orchestrator module 230, a root cause analysis module 235, an incident processing module 260, a self-healing module 265, a preemptive incident module 270, a self-healing prevention module 275, a query check module 280, a retrieval module 285, an action module 290 and interrogation module 295. Each processing module may include hardware and software elements.

The first network interface 205 can be configured to receive information from the one or more input elements 110. It should be understood that the first network interface 205 may include any interface configured to send and receive data from any of the one or more input elements. In some implementations of the teachings herein, the first network interface may be configured as a chat agent user interface, where the chatbot receives information from one or more input elements, and from where the chatbot is configured to send information (e.g., responses) to the one or more input elements.

The second network interface 210 can be configured to receive information from a variety of sources in enterprise platform 140. It should be understood that the second network interface 210 may include any interface configured to send and receive data from any of the sources in the enterprise platform. In some implementations of the teachings herein the second network interface may be configured as a chat agent system interface, where the chatbot receives information from one or more components within the enterprise platform, sends the data to a generative AI system to obtain a likely root cause of an issue or means of preventing of issue, and from which the chatbot is configured to send information to one or more system components of the enterprise platform.

Processor 215 is configured to control the overall operation of incident management engine 160. The processor may include one or more microcontrollers, microprocessors, application specific processors, field programming gate array (FPGA) for managing multiple processes occurring within incident management engine 160. Although one processor is described, the incident management engine may include a plurality of processors.

Memory 220 (e.g., random access memory (RAM), non-volatile secondary storage, hard drive, a floppy drive, and a CD-ROM drive) may include one or more libraries (e.g., API library, etc.), and one or more databases (e.g., knowledge vector database, chat history database, etc.), and may store data (e.g., historical data, training data, operational data, chat queries, etc.), business logic rules, applications (e.g., incident management application 225), and computer executable instructions.

The orchestrator module 230 manages the coordination and integration of multiple processing modules within the incident management engine for a seamless processing environment. The orchestrator module contains instructions that when executed by the processor, cause the processor to analyze inputs received at the first and second network interfaces to understand the intent of the inputs and then route appropriate information to a corresponding processing module that is best equipped to manage that particular intent.

An input received at the orchestrator module 230 may represent an event notification related to an incident or non-incident. An incident is understood to mean an unexpected event or occurrence that has disrupted the normal functioning of a system, service, or business process. A non-incident is understood to mean not an incident, which is the catch all designation for all other inputs. When the orchestrator module determines that an input is an event notification related to an incident, the orchestrator module understands the intent of this event as an input for root cause analysis 235 and routes appropriate information to root cause analysis module 235 for processing, as discussed further below. When the orchestrator module determines that an input is an event notification related to a non-incident, the orchestrator module further determines whether the input is i.) an alert/notification, ii.) an inquiry or iii.) a request. If the input is an alert/notification, then the orchestrator module 230 understands the intent of this event as an input for interrogation module 295 and routes appropriate information to interrogation module 295 for processing, as discussed further below. If the input is an inquiry, then the orchestrator module understands the intent of this event as an input for retrieval module 285 and routes appropriate information to retrieval module for processing, as discussed further below. If the input is a request, then the orchestrator module 230 understands the intent of this event as an input for action module 290 and routes appropriate information to action module 290 for processing, as discussed further below.

In some implementations of the teachings herein, the inputs received at the chat agent user interface 205 (i.e., the first network interface) may include conversational content (e.g., user questions, commands or statements) related to an incident (e.g., a system outage, a service disruption, or unintended behavior by the system/service) or related to a non-incident (e.g., a general query, a status inquiry for an application, database, orders, etc.).

So, for example, a user may send information, such as, for example, a query stating, "What is the root cause of the current system outage?" In this instance, the input represents an event notification related to an incident. In another example, a user may send information, such as, for example, a query stating, "What is the current status of the messaging infrastructure?" In this instance, the input represents an event notification related to a non-incident (i.e., an inquiry).

In some implementations of the teachings herein, the inputs received at the chat agent system interface 210 (i.e., the second network interface) may include alerts and/or notifications from one or more system components in the enterprise platform. The alert and/or notification may be related to an incident or a non-incident. So, for example, the chat agent system interface 210 may receive a system outage alert from one of the system components of enterprise platform. In this instance, the input represents an event notification related to an incident. In another example, the chat agent system interface may receive a high CPU usage alert. In this instance, the input represents an event notification related to a non-incident (i.e., an alert/notification).

Figure 3:
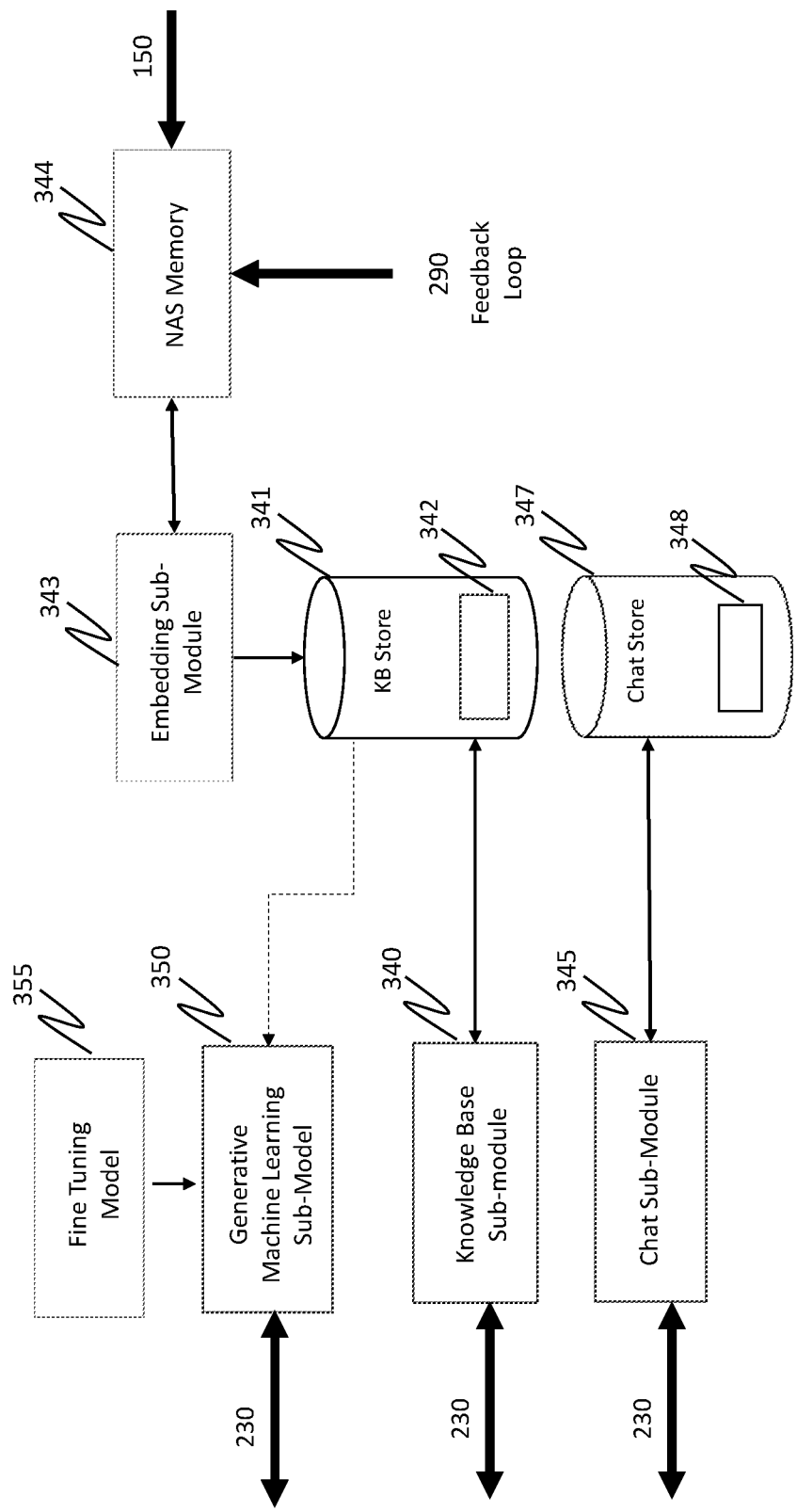
FIG. 3 depicts a high-level block diagram representative of a root cause analysis module according to an embodiment of the present disclosure.

Turning to FIG. 3, the root cause analysis module 235 may include a knowledge base sub-module 340, a knowledge base database 341, a knowledge base store 342, an embedding sub-module 343, a NAS memory 344, a chat sub-module 345, a chat store 347, a chat history database 348, a generative AI sub-model 350 (e.g., a large language model (LLM)), and a fine tuning sub-module 355. The root cause analysis module 235 contains instructions that when executed by the processor 215, cause the processor to execute one or more algorithms to identify one or more likely causes of an incident using knowledge base sub-module 340, chat sub-module 345, and generative AI sub-model 350.

The knowledge base sub-module 340 contains instructions that when executed by the processor 215, cause the processor to execute one or more algorithms to search knowledge base database 342 in knowledge base store 341 to search for content similar to the input information received from orchestrator module 230. The knowledge base store 341 is a repository of information regarding any topics, products, or services that helps to provide context to generative AI sub-model 350. The information may be collected iteratively from one or more sources and may include internal documents, manuals, FAQs, existing databases, or any other relevant resources. The information is collected iteratively to ensure that the knowledge base has the most up to date information. In some implementations of the teachings herein, the one or more data sources may be external data sources.

In some implementations of the teachings herein, the knowledge base database represents an enterprise knowledge base, which is a repository of an organization's internal information, such as, workflows, IT processes, business operations, etc.

In some implementations of the teachings herein, the information may be retrieved from network attached storage (NAS) 150, and stored in NAS memory 344. The retrieved information may include incident summaries, application exception logs, alerts, operator-editable wikis for apps, issue documents, application topology, change history, and information from a reference database store. Moreover, information may be provided to the knowledge base database 342 from a feedback loop (e.g., newly created incident summaries) in the incident management engine 160.

The information collected from the one or more sources is preprocessed and then stored in knowledge base store 341. In some implementations of the teachings herein, metadata may also be included in the knowledge base store. Preprocessing the information may include extracting text data from any files/documents, splitting the text data into chunks, and converting the chunks into vector embeddings, using embedding sub-module 343, and storing the vector embeddings in the knowledge base store.

The embedding sub-model 343 contains instructions that when executed by the processor 215, cause the processor to execute one or more algorithms to convert the chunks of text, such as knowledge base articles or logs, into embeddings stored in a vector database 341.

In some implementations of the teachings herein, metadata is included in the knowledge base database 342 to improve the search capabilities. The metadata may allow for advanced search features such as filtering and refining results based on metadata attributes. Further, metadata may be incorporated in the knowledge base database 342 as tags and keywords to describe the content of each entry. The tags can be used to highlight key concepts or themes, which thereby improves the searchability to discover related information.

The chat sub-module 345 contains instructions that when executed by the processor 215, cause the processor to search chat history database 348 in chat store 347 for context information similar to the input information received from orchestrator module 230. In some implementations of the teachings herein, keywords and phrase matching techniques may be used to identify relevant messages within the chat history database 348.

Moreover, in some implementations of the teachings herein, relevance scores may be assigned to relevant messages based on their proximity to the current input information, the frequency of keywords, or other criteria, and the most relevant messages may be presented to orchestrator module 230 as part of the context.

Further, chat sub-model 345 contains instructions that when executed by the processor 215, cause the processor to store the interactions and messages exchanged between input elements 110 and the chatbot 160 (i.e., chat history). It includes the sequence of information (e.g., messages or prompts) sent and received during the course of an exchange (e.g., a conversation/chat session) between an input element and the chatbot.

The chat history may be stored in one or more databases (e.g., chat history database 348) in chat store 347 for persistence and scalability. Each chat session may be represented as a record in a database table. In some implementations of the teachings herein, the chat history may be stored as files either locally or on a server. Each file may represent a conversation of set of interactions. Moreover, in some implementations of the teachings herein, chat messages may be stored using message queuing systems.

The chat history is crucial for maintaining context, tracking the flow of the conversation, providing a record of past interactions, and prompt engineering. The chat history can be valuable for training and improving the generative AI model 350. Analysis of historical interactions can help identify common user queries, areas for improvement, and patterns that can inform model updates or fine-tuning.

Generative AI sub-model 350 contains instructions that when executed by the processor 215, cause the processor to execute a generative AI system to evaluate input information consistent with the context provided to understand the intent and generate a response based on its learned patterns and context. In some implementations of the teachings herein, the generative AI system is a large language model (LLM). The LLM may be initially trained on a massive corpus of diverse text data from one or more sources. The diverse text may include a wide range of topics, languages, and writing styles. The model learns the patterns, context, and relationships within the data.

Fine tuning sub-module 355 contains instructions that when executed by the processor 215, cause the processor to perform additional training on the generative AI sub-model 350 using a fine tuning dataset, which may include a narrower dataset that is specific to a desired application, such as chatbot interactions, customer support, or content generation.

In operation, when the root cause analysis module 235 receives information from orchestrator module 230, it performs an automated root cause analysis. In some implementations of the teachings herein, the root cause analysis module may also receive input information from one or more internal processing modules (e.g., incident detection module 260), which may also trigger the root cause analysis module to perform an automated root cause analysis.

The automated root cause analysis starts by obtaining context information from knowledge base sub-module 343 and/or chat sub-module 345. The orchestrator module 230 forwards the input information (i.e., the event notification related to an incident) and a get context instruction to the root cause analysis module 235, which initiates a search action in the knowledge base database 342 and/or chat history database 348 for content similar to the input information. Embedding sub-module 343 may be used to create an embedding for the input information, which may be used to query the knowledge base store 341 for similar vector embeddings, and in particular to search for a top number (i.e., a predetermined or designated number) of relevant content and return the content to the orchestrator module 230. The knowledge base sub-module 340 may search the knowledge base store 341 for context information by performing a similarity search (e.g., K nearest neighbor in cosine similarities).

The results of the search action (i.e., which represents context information) are sent to the generative AI sub-module 350, along with the input information, for further processing. The generative AI sub-module 350 generates a response for the input information based on its training and provides the response to orchestrator module 230, which integrates the response into a chatbot response and provides the response to the operation user (i.e., the initiator of the inquiry that triggered the response). In some implementations of the teachings herein, the response is sent to query check module 280 before being provided to orchestrator module 230 and the operation user.

The query check module 280 contains instructions that when executed by the processor 215, cause the processor to perform one or more checks on the responses generated by the generative AI sub-module, such as, for example, enterprise policy check, hallucination check and personally identifying information (PII) data checks. An enterprise policy check may involve evaluating the generated responses to ensure compliance with organizational policies, legal requirements, and ethical standards. A hallucination check may assess whether the responses generated by the LLM are not consistent with known facts or contextually not relevant. A PII data check may ensure that sensitive information is not disclosed inappropriately. Once the query check module 280 has evaluated the response generated by the LLM, the response is provided to orchestrator module 230, which integrates the response into a chatbot response and provides the response to the end user.

In some implementations of the teachings herein, orchestrator module 230 may interface with generative AI sub-module 350 and query check module 280 via an API gateway. The API gateway may provide additional centralized logging and monitoring capabilities.

If after processing the event notification related to an incident the root cause analysis module 235 is unable to identify one or more likely causes of the incident, the root cause analysis module may send a notification to self-healing module 265 for further processing, as discussed further below.

As noted above, when the orchestrator module determines that an input is an event notification related to a non-incident, and in particular, an inquiry, the orchestrator module routes appropriate information to retrieval module 285 for processing. Retrieval module 285 contains instructions that when executed by the processor 215, cause the processor to analyze input information (i.e., an inquiry), understand the intent of the inquiry, map the intent to one or more specific data sources, formulate one or more queries or request to retrieve data from the one or more specific data sources process and transform the retrieved data, and integrate the retrieved data into a chatbot response. The one or more specific data sources may include an operational database, a reference database, a log system, a monitoring system, Prometheus database etc.

The retrieval module 285 may include predefined mappings or configurations that link an inquiry to specific external data sources. The retrieval module may include predefined mappings or configurations for a predefined number of inquiry types. The mappings can be established through configurations, scripts, or rules that provide guidance on where to look for the required information. Moreover, the retrieval module may use natural language processing techniques to understand the input information and the intent thereof.

So, for example, if an input states, "What is the current status of the messaging infrastructure?" The retrieval module may identify Prometheus database as the data source for this inquiry type. The enterprise platform may include a Prometheus monitoring and alerting tool which may be configured to collect, store, and query metrics from various components of the platform including the messaging infrastructure. The metrics may be stored in a database which is accessible to retrieval module 285.

Once the data source is identified, the retrieval module may retrieve corresponding status data from the Prometheus database, such as, for example, message queue metrics, number of messages currently in the queue; the rate at which messages are being processed or sent; the time it takes for a message to be processed from the time it is enqueued, etc. The retrieved data is provided to orchestrator module 230 which integrates the data into a chatbot response and provides the response to the operation user.

Further, when the orchestrator module 230 determines that an input is an event notification related to a non-incident, and in particular, a request, the orchestrator module 230 understands the intent of this event as an input for action module 290 and routes appropriate information to action module 290 for processing. Action module 290 contains instructions that when executed by the processor 215, cause the processor to analyze input information (i.e., a request), understand the intent of the inquiry, and perform the request. The action module may be configured to perform one or more tasks for a corresponding request type. The action module may be programmed to perform one or more tasks for a predefined number of request types.

So, for example, the action module may receive a request "Can you create a summary of today's incident having incident number X with relevant details?", "Can you send the incident summary to XYZ?". In this instance, the action module may retrieve information related to incident number X from one or more sources such as, for example, NAS 150, knowledge base store 341, chat store 347, or other data storage, including an incident history store, a store logging past alerts, a store cataloguing past system changes, etc.

The action module 290 may employ predefined templates or algorithms to generate the incident summary. The template could include placeholders for dynamically inserted information based on the extracted details, such as, for example, "Incident Summary: [Incident Type] reported on [Date] for [Affected System].

Initial investigation indicates [Key Finding]."

In some implementations of the teachings herein, the incident summary may include one or more newly identified root causes and/or one or more newly identified resolutions.

Once the incident summary is generated, the action module may use an integrated email service to send the incident summary to "XYZ" as requested. In some implementations of the teachings herein, depending on the incident type and organizational processes, the action module may automatically initiate follow-up actions, such as notifying relevant stakeholders, assigning tasks to teams, or escalating the incident based on severity.

In some implementations of the teachings herein, the action module 290 may receive a feedback loop request from one or more other processing modules in the incident management engine 160. In this instance, the action module is configured to update the knowledge base database 342 with new information, such as, for example, new incident summaries and newly identified root causes.

Further, when the orchestrator module 230 determines that an input is an event notification related to a non-incident, and in particular, an alert or notification, the orchestrator module 230 understands the intent of this event as an input for an interrogation module 295 and routes appropriate information to the interrogation module 295 for processing. The interrogation module contains instructions that when executed by the processor 215, cause the processor to obtain information from one or more sources to provide helpful information related to the alert. For example, when an alert related to high CPU usage is received, the interrogation module may obtain information from one or more sources, including log data, change history, processes currently being executed by the CPU, including batch jobs, etc., to provide insight into why the CPU usage is high. The interrogation module may provide this information to an operation user and respond at points during the interrogation by undertaking self-healing actions, including but not limited to restarting the server, flipping the active server from a blue rail to a green rail or vice versa, or any other self-healing action described throughout this disclosure.

The preemptive incident module 270 contains instructions that when executed by the processor, cause the processor to perform one or more preemptive incident processes to detect one or more potential incidents (i.e., an incident that will inevitably occur if a preventative action is not performed) in enterprise platform 140. When a potential incident is detected by the preemptive incident module 270, a notification is sent to the self-healing prevention module 275 for further processing, as discussed further below.

In some implementations of the teachings herein, the one or more preemptive incident processes may include generating and traversing a batch dependency graph to detect one or more offending batch jobs.

The batch dependency graph represents the relationships and dependencies between different batch jobs. Each node in the graph corresponds to a specific batch job, and directed edges indicate dependencies. For instance, if batch job B depends on the completion of batch job A, then there would be a directed edge from A to B. In this instance, if batch job A is detected as running late, its late execution can have a cascading effect on dependent batch job B, and thus batch job A will be considered an offending batch job, and the preemptive incident module 270 will flag this as a potential incident and alert self-healing prevention module 275.

Self-healing prevention module 275 contains instructions that when executed by the processor 215, cause the processor to analyze inputs received from the preemptive incident prevention module 270 and to perform one or more self-healing prevention actions to prevent a detected potential incident from occurring.

When self-healing prevention module 275 receives an alert that a batch dependency potential incident has been detected, the self-healing prevention module may generate an alert to notify one or more appropriate entities (IT operation user) of the detected potential incident. An alert can take the form of notifications, emails, SMS messages, or other communication methods. In some implementations of the teachings herein, the self-healing prevention module 275 may initiate a batch scheduling process to adjust the schedule of one or more batch jobs to ensure that any downstream dependent jobs are processed successfully.

Further, in some implementations of the teachings herein, the one or more preemptive incident processes may include breaching threshold detection. In this instance one or more monitoring devices may interface with the preemptive incident module 270. The monitoring devices may continuously track and collect data on various metrics in real time, such as, for example, CPU usage, memory usage, network traffic, network address storage (NAS), server load balancing, etc., and when the value of a monitored metric goes beyond a defined threshold, either exceeding an upper limit or falling below a lower limit, it is considered to have breached the threshold (i.e., potential incident). This is an indication that an incident related to the corresponding monitored metric may be imminent if no action is taken. The preemptive incident module will detect the breached threshold and alert the self-healing prevention module 275.

When a threshold is breached, an alert may be generated by the self-healing prevention module 275 and provided to an operations team. Upon receiving a breaching threshold alert, the operations team can investigate the root cause of the deviation (e.g., by sending an event notification to the incident management engine) and take corrective actions. This may involve adjusting configurations, optimizing resource allocation, or resolving issues that contributed to the threshold breach.

In some implementations of the teachings herein, the self-healing prevention module 275 may perform one or more automated actions (self-healing prevention actions) when a threshold is breached, such as, for example, the self-healing prevention module may take a bad server out of rotation when a server load balancing threshold is breached. Further, the self-healing prevention module may traverse an application log and delete files older than a predetermined number of days (i.e., self-healing preventative action) when a storage threshold alert is not addressed, and the storage is not resized on time (i.e., potential incident).

If, for some reason, the intended preemptive action is not available and the environment in which the problematic is redundant because multiple versions of the software are operable on different rails, there can be a flip of the rail from the green to the blue or vice versa in a blue-green system, so that requests for the software in that environment will go to a different set of servers and modules upon which the servers depend.

If the environment is not redundant, a banner is preferably posted with information for users about the existing problem. The banner may be automatically generated, or manually generated, and may be triggered automatically or by an approved request to one or more approving individuals, based on criteria such as who identified an actual or possible outage, the scope or impacts of outage, the audience for a potential banner, and confirmation of the accuracy of the notice. The banner may also be reviewed by one or more approving individuals after its generation, and ultimately distributed only after the final approval by one with authority.

In some implementations of the teachings herein, the one or more preemptive incident processes may include performing intelligent issue summarization based on similar alerts which have been aggregated or logged. A generative AI algorithm may be used to analyze and aggregate alerts that share similarities and to make intelligent issue summarization therefrom. By analyzing and summarizing historical incident data, intelligent issue summarization can help identify patterns, trends, or recurring issues. Early detection of these patterns (i.e., potential incidents) by the preemptive incident module will allow for preventative measures to be taken by the self-healing prevention module before the underlying problems escalate into incidents. In some implementations of the teachings herein, the self-healing prevention module may send an alert to an operations team for further action. In some implementations of the teachings herein, the self-healing prevention module may perform one or more automated processes to prevent the potential incident(s) from occurring.

An incident detection module 260 contains instructions that when executed by the processor 215, cause the processor to perform one or more incident detection processes to detect one or more incidents in real-time. When an incident is detected by incident detection module, a notification is sent to self-healing module 265 for further processing, as discussed further below.

A self-healing module 265 contains instructions that when executed by the processor 215, cause the processor to receive inputs from root cause analysis module 235 and incident detection module 260 and determine whether one or more self-healing actions (i.e., actions performed autonomously without external intervention) can be orchestrated in the incident management engine 160 (i.e., chatbot) to manage the incident. The self-healing module is configured to automate one or more processes in response to one or more predefined incidents.

In some implementations of the teachings herein, the one or more incident detection processes may include periodically checking the batch status of batches using a batch central repository. The batch central repository may provide real-time monitoring of active batch jobs, such as, for example, whether the batch job is running, completed, or if any issues have occurred (e.g., an ending of the process under abnormal circumstances, or "abend").

The batch central repository may keep a history of batch job executions, storing information such as start times, end times, and the status of each execution. This historical data allows for tracking how batch statuses have changed over time. Moreover, the batch central repository may include status indicators or flags associated with each batch job entry in the repository. These indicators may show the current state of the job, such as "Running," "Completed," "Failed," or other relevant statuses (e.g., "ABEND"). The batch central repository may be integrated with notification systems to alert the incident processing module when certain events occur, such as job failures. In some implementations of the teachings herein, the batch central repository may be integrated with notification systems to alert administrators or operators when certain events occur, such as job failures.

The incident processing module 260 may detect an incident by checking the batch central repository or by receiving an alert or failure notification from the batch central repository. So, for example, if the incident processing module detects that a batch job ended abnormally (ABEND) (i.e., incident) the incident processing module may take one or more actions (i.e., self-healing actions) based on a rule engine.

In some implementations of the teachings herein, the rule engine may indicate that a batch job that ended abnormally should be restarted if it ended without completion. In this instance, the rule engine may establish the following rules:

The batch central repository shall generate an alert or failure notification, and the failure notification may be provided to the self-healing module.

The self-healing module 265 shall initiate an adhoc job to restart the batch job that ended abnormally without completion using, for example, a job control language (JCL) script.

The self-healing module 265 shall deploy one or more banners based on one or more prebuilt conditions.

The self-healing module 265 shall deploy a banner indicating the ETA (i.e., projected completion time).

The self-healing module 265 shall deploy a banner when the ETA has been exceeded. The banner language may be predetermined or customized.

Once the batch is complete, the self-healing module 265 shall remove the banner, send a summary email, update any dashboard with status information and create a ServiceNow ticket (or ticket in another support ticket framework) with severity.

In some implementations of the teachings herein, the rule engine may indicate that a batch job that ended abnormally without completion should first be analyzed for one or more root causes for the incident, and then be restarted automatically one the issue is resolved. In this instance the rule engine may establish the following rules:

The self-healing module 265 shall deploy a banner indicating that service is currently unavailable.

The incident processing module 260 shall send a query to the root cause analysis module 235.

The self-healing module 265 shall wait for a response from the root cause analysis module.

Once a response is received from the root cause analysis module 235, the self-healing module 265 shall deploy a confirmation banner with the details.

Once the issue is resolved, the self-healing module 265 shall automatically restart the batch.

Once the batch is complete, the self-healing module 265 shall remove the banner, send a summary email, update any dashboard with status information and create a ServiceNow ticket (or ticket in another support ticket framework) with severity.

In some implementations of the teachings herein, the self-healing module 265 may resolve the issue identified by the root cause analysis module 235 if it is configured to do so, otherwise, the issue may be resolved by another processing module or by an operation user (e.g., IT administrator).

In some implementations of the teachings herein, the self-healing module 265 may receive a notification from root cause analysis module 235 indicating that a root cause for a rail management incident was not identified. The self-healing module is configured to take one or more actions based on a rule engine.

The rule engine may indicate that a rail may fail over to a "dark" or "cold" rail (that is, another rail in the blue-green or similar system) in the following scenarios:

Post release if issues occur and the cold rail has old code so long as no dependencies exist Hot/cold setup where same version of the code is deployed, and an issue is infrastructure related.

In either scenario the rule engine may establish the following rules:

The self-healing module 265 shall perform infra lookup and troubleshooting
  a) Run synthetics—Apica status—Call the service (URL/API) to retrieve the health; check every 15 minutes
  b) Run server nanny checks (Ping servers)
  c) deploy a banner indicating that service is currently unavailable.

The self-healing module shall flip a rail with predefined commands (server specific) if an entire rail is down and other rail is cold but has same code.

The self-healing module shall take host out of rotation if issues are intermittent use results from infra checks to find out which server is down a) If all servers all down→restart Java virtual machines (jvms) and check again after 5 minutes
  b) If some of the hosts are down→take down host out of rotation and restart jvms and check again in 5 minutes The self-healing module shall send a summary to appropriate entities and create a ServiceNow ticket In some implementations of the teachings herein, the self-healing module 265 may receive a notification from root cause analysis module 235 indicating that a cause for the incident was not identified. The self-healing module is configured to manage this type of outcome for a predefined number of incident types by posting a service unavailability banner. The predefined number of incident types may include circuit breakers related to external subsystems that a system will communicate with, MQ backlogs, and batch delays. Once the incident is resolved, the self-healing module may remove the banner, send a summary email, update dashboard with status information, create a ServiceNow ticket with severity, and update the knowledge base database with any newly identified root causes (i.e., by sending a feedback look request to action module 290).

Figure 4A:
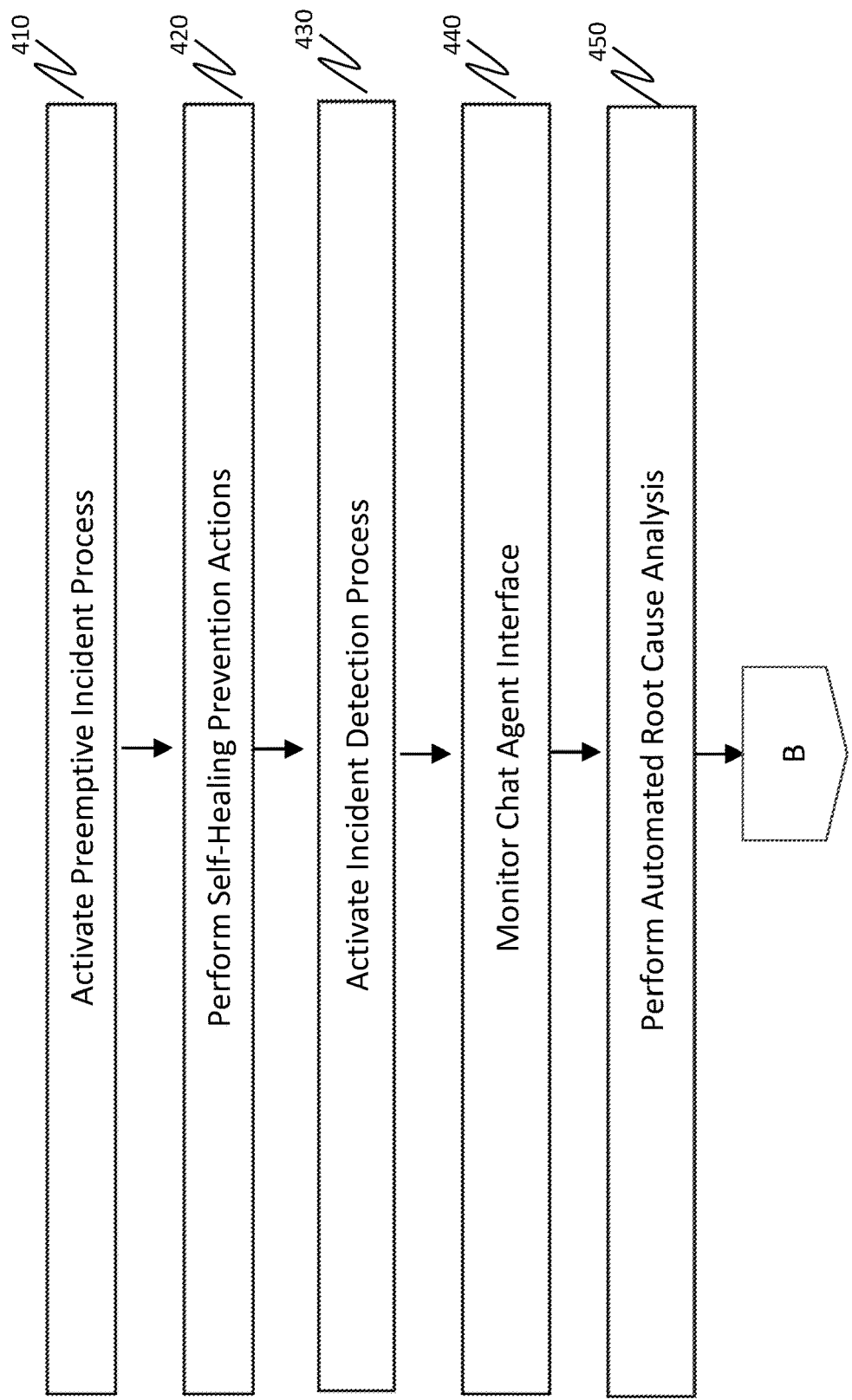
FIG. 4A depicts a high-level flow diagram of a preemptive incident prevention and self-healing process according to an embodiment of the present disclosure.
Figure 4B:
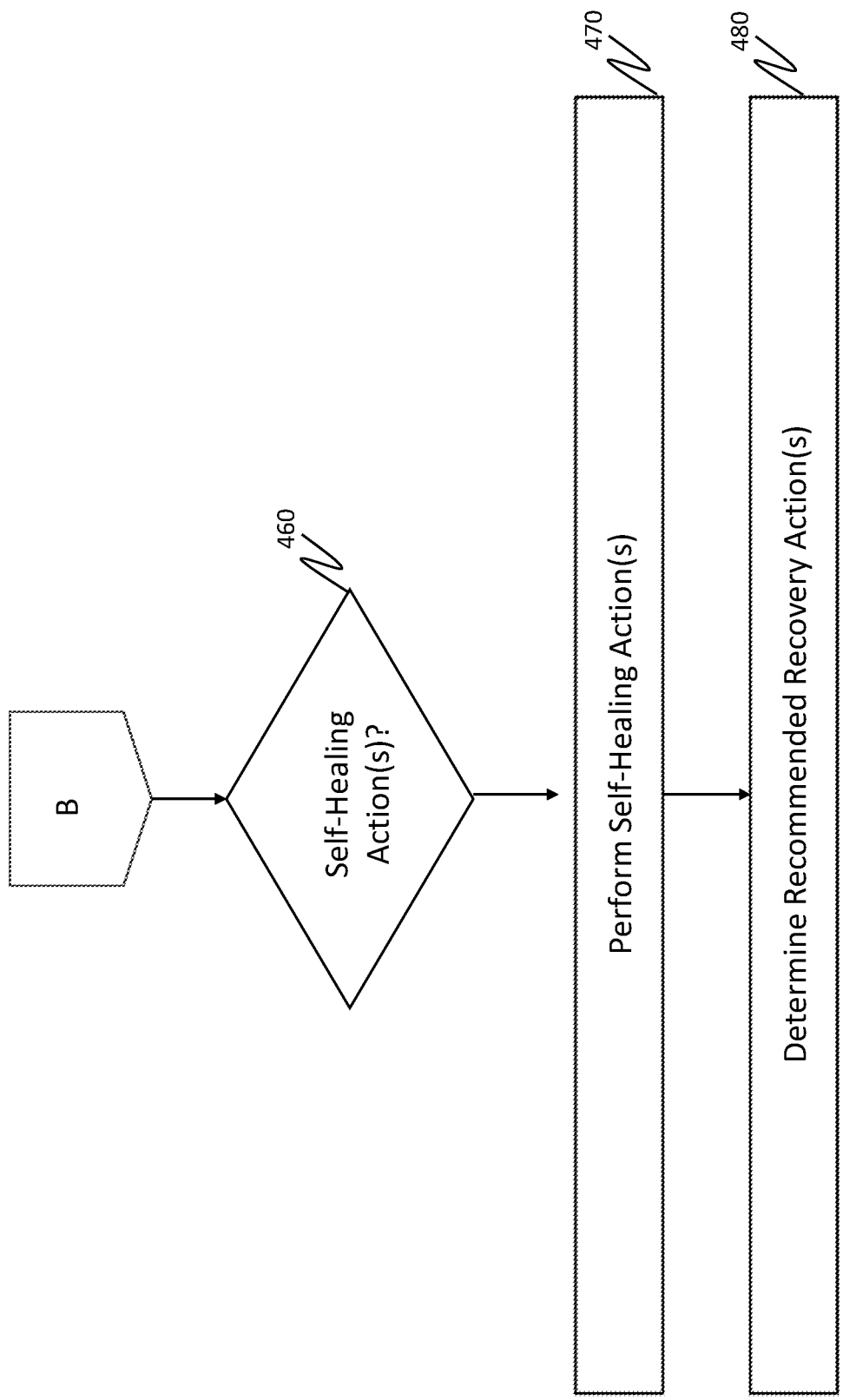
FIG. 4B depicts a continuation of the high-level flow diagram of FIG. 4A.

Turning to FIGS. 4A-4B, an example high level flow diagram 400 of a method for performing preemptive incident prevention and self-healing process in a system 100 according to teachings of the present disclosure is shown.

At step 410, orchestrator module 230 triggers preemptive incident module 270 which activates one or more preemptive incident processes to detect one or more potential incidents. When a potential incident is detected, preemptive incident module notifies self-healing prevention module 275.

At step 420, self-healing prevention module 275 automatically performs one or more corresponding self-healing prevention actions in response to detection of one or more potential incidents.

At step 430, orchestrator module 230 triggers incident detection module 260 which activates one or more incident detection processes to detect an incident in the computer system.

At step 440, orchestrator module 230 monitors chat agent interface (i.e., first network interface 205 and second network interface 210) to determine whether an event notification has been received.

At step 450, root cause analysis module 235 automates a root cause analysis in response to receipt of an event notification related to an incident to determine a likely cause of the incident.

At step 460, self-healing module 265 determines whether one or more self-healing actions can be orchestrated to manage an incident detected by the one or more incident detection processes and/or the event notification related to an incident.

At step 470, self-healing module 265 automatically performs one or more self-healing actions when it is determined that the one or more self-healing actions can be orchestrated to manage the incident detected by the one or more incident detection processes and/or the event notification related to an incident.

At step 480, self-healing module and/or orchestrator module 230 may determine one or more recommended recovery actions to manage the incident when it is determined that one or more self-healing actions cannot be orchestrated in the chatbot to manage the incident detected by the one or more incident detection processes and/or the incident in relation to the event notification.

In some implementations of the teachings herein, self-healing module may coordinate with orchestrator module 230 to access knowledge base 341 and/or generative AI sub-model 350 for resolution information related to the incident. The self-healing module may use the resolution information to form one or recommended recovery actions to manage the incident.

In some implementations of the teachings herein, the incident management engine 160 may include a verification process module to verify whether the performance of the one or more self-healing actions resolved the incident.

Computing Devices Generally

Figure 5:
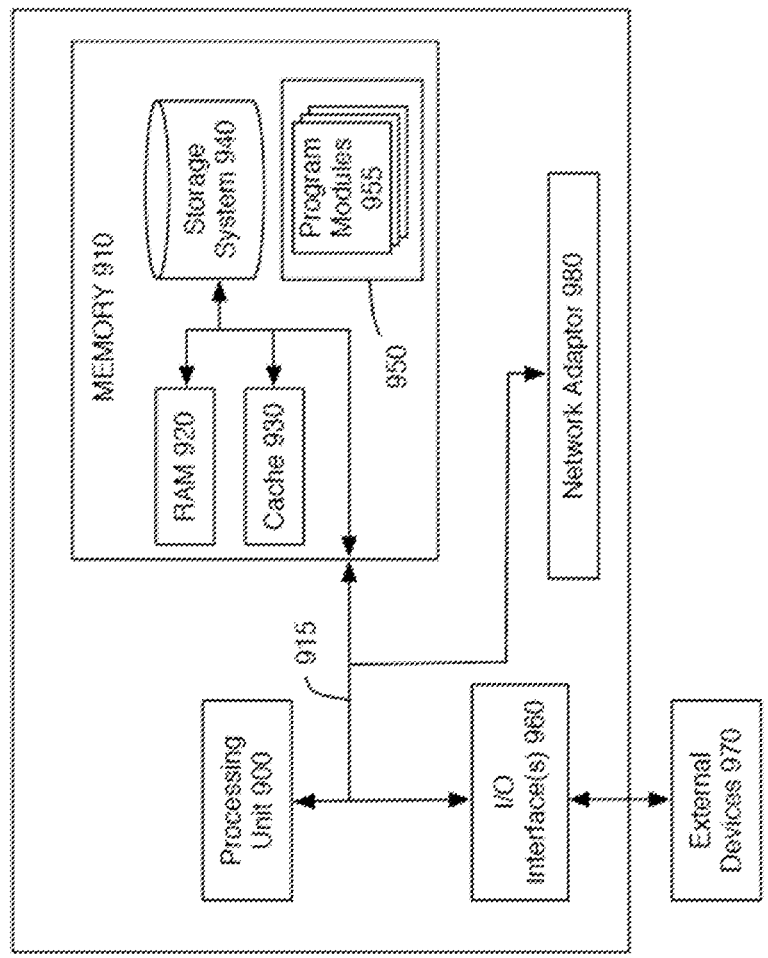
FIG. 5 is a high-level block diagram of a representative computing device that may be utilized to implement various features and processes described herein.

Although FIG. 1 depicts a preferred configuration of specific computing devices for accomplishing the software-implemented methods described above, those methods do not inherently rely on the use of any particular specialized computing devices, as opposed to standard desktop computers and/or web servers. For the purpose of illustrating possible such computing devices, FIG. 5 is a high-level block diagram of a representative computing device that may be utilized to implement various features and processes described herein. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 7, the components of the computing device may include (but are not limited to) one or more processors or processing units 900, a system memory 910, and a bus 915 that couples various system components including memory 910 to processor 900.

Bus 915 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 900 may execute computer programs stored in memory 910. Any suitable programming language can be used to implement the routines of particular implementations including C, C++, Java, assembly language, etc. Different programming techniques can be employed such as procedural or object oriented. The routines can execute on a single computing device or multiple computing devices. Further, multiple processors 900 may be used.

The computing device typically includes a variety of computer system readable media. Such media may be any available media that is accessible by the computing device, and it includes both volatile and non-volatile media, removable and non-removable media.

System memory 910 can include computer system readable media in the form of volatile memory, such as random access memory (RAM) 920 and/or cache memory 930. The computing device may further include other removable/non-removable, volatile/non-volatile computer system storage media. By way of example only, storage system 940 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 915 by one or more data media interfaces. As will be further depicted and described below, memory 910 may include at least one program product having a set (e.g., at least one) of program modules that are configured to carry out the functions of implementations described in this disclosure.

Program/utility 950, having a set (at least one) of program modules 955, may be stored in memory 910 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 970 such as a keyboard, a pointing device, a display, etc.; one or more devices that enable a user to interact with the computing device; and/or any devices (e.g., network card, modem, etc.) that enable the computing device to communicate with one or more other computing devices. Such communication can occur via Input/Output (I/O) interface(s) 960.

In addition, as described above, the computing device can communicate with one or more networks, such as a local area network (LAN), a general wide area network (WAN) and/or a public network (e.g., the Internet) via network adaptor 980. As depicted, network adaptor 980 communicates with other components of the computing device via bus 915. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may use copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A computer implemented method of managing incidents in a computer system including a chatbot to provide preemptive incident prevention and self-healing processing, the method comprising the steps of:
    activating one or more preemptive incident processes to detect one or more potential incidents in the computer system;
    automatically performing one or more corresponding self-healing prevention actions in response to detecting the one or more potential incidents;
    activating one or more incident detection processes to detect an incident in the computer system;
    monitoring a chat agent interface to determine whether an event notification has been received;
    performing an automated root cause analysis, in response to receiving an event notification related to an incident, to determine a likely cause of the incident;
    determining whether one or more self-healing actions can be orchestrated in the chatbot to manage the incident detected by the one or more incident detection processes and/or the event notification related to an incident;
automatically performing the one or more self-healing actions when it is determined that the one or more self-healing actions can be orchestrated to manage the incident detected by the one or more incident detection processes and/or the event notification related to an incident; and
determining one or more recommended recovery actions to manage the incident when it is determined that the one or more self-healing actions cannot be orchestrated in the chatbot to manage the incident detected by the one or more incident detection processes and/or the incident in relation to the event notification.

2. The method of claim 1 further comprising performing an automated verification process to verify that the performance of the one or more self-healing actions resolved the incident.

3. The method of claim 2 further comprising generating an incident summary including one or more newly identified root causes and/or one or more newly identified resolutions.

4. The method of claim 3 further comprising updating an enterprise knowledge base in the chatbot with the incident summary.

5. The method of claim 1 further comprising retrieving data from one or more real time operational data and reference data sources in response to receiving an event notification related to a non-incident inquiry and providing a chatbot response using the retrieved data.

6. The method of claim 5 further comprising updating the enterprise knowledge base in the chatbot with the data retrieved from the one or more real time operational data and reference data sources.

7. The method of claim 1 further comprising continuously retrieving new data from one or more data sources and updating an enterprise knowledge base in the chatbot with the new data.

8. The method of claim 1 further comprising performing at least one action within the chatbot from a group including an enterprise policy check, a hallucination check and a personally identifiable information (PII) data check.

9. The method of claim of claim 1 wherein the one or more preemptive incident processes include one or more processes from a group including traversal of a batch dependency graph, detecting breach thresholds, and performing intelligent issue summarization.

10. The method of claim 1 wherein the one or more self-healing actions include one or more actions from a group including batch management actions, rail management actions and banner actions.

11. A system for managing incidents, the system comprising:
one or more input elements;
one or more storage devices, including at least one database;
one or more processors;
one or more network interfaces for communication with the one or more input resources; and
a chatbot comprising:
a non-transitory memory comprising instructions that, when executed by the one or more processors, cause the one or more processors to:
activating one or more preemptive incident processes to detect one or more potential incidents;
automatically performing one or more corresponding self-healing prevention actions in response to detecting the one or more potential incidents;
activating one or more incident detection processes to detect an incident in the computer system;
monitoring a chat agent interface to determine whether an event notification has been received;
performing an automated root cause analysis, in response to receiving an event notification related to an incident, to determine a likely cause of the incident;
determining whether one or more self-healing actions can be orchestrated in the chatbot to manage the incident detected by the one or more incident detection processes and/or the event notification related to an incident;
automatically performing the one or more self-healing actions when it is determined that the one or more self-healing actions can be orchestrated to manage the incident detected by the one or more incident detection processes and/or the event notification related to an incident; and
determining one or more recommended recovery actions to manage the incident when it is determined that the one or more self-healing actions cannot be orchestrated in the chatbot to manage the incident detected by the one or more incident detection processes and/or the incident in relation to the event notification.

12. The system of claim 11 wherein the non-transitory memory further comprises instructions that, when executed by the one or more processors, cause the one or more processors to:
perform an automated verification process to verify that the performance of the one or more self-healing actions resolved the incident.

13. The system of claim 11 wherein the non-transitory memory further comprises instructions that, when executed by the one or more processors, cause the one or more processors to:
generate an incident summary including one or more newly identified root causes and/or one or more newly identified resolutions.

14. The system of claim 11 wherein the non-transitory memory further comprises instructions that, when executed by the one or more processors, cause the one or more processors to:
update an enterprise knowledge base in the chatbot with the incident summary.

15. The system of claim 11 wherein the non-transitory memory further comprises instructions that, when executed by the one or more processors, cause the one or more processors to:
retrieve data from one or more real time operational data and reference data sources in response to receiving an event notification related to a non-incident inquiry and providing a chatbot response using the retrieved data.

16. The system of claim 11 wherein the non-transitory memory further comprises instructions that, when executed by the one or more processors, cause the one or more processors to:
update the enterprise knowledge base in the chatbot with the data retrieved from the one or more real time operational data and reference data sources.

17. The system of claim 11 wherein the non-transitory memory further comprises instructions that, when executed by the one or more processors, cause the one or more processors to:
   continuously retrieve new data from one or more data sources and update an enterprise knowledge base in the chatbot with the new data.

18. The system of claim 11 wherein the non-transitory memory further comprises instructions that, when executed by the one or more processors, cause the one or more processors to:
   perform at least one action within the chatbot from a group including an enterprise policy check, a hallucination check and a personally identifiable information (PII) data check.

19. The system of claim 11 wherein the one or more preemptive incident processes include one or more processes from a group including traversal of a batch dependency graph, detecting breach thresholds, and performing intelligent issue summarization.

20. The system of claim 11 wherein the one or more self-healing actions include one or more actions from a group including batch management actions, rail management actions and banner actions.

* * * * *